UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

CATALYTIC MATERIAL AND PROCESS OF MAKING THE SAME.

1,372,736. Specification of Letters Patent. Patented Mar. 29, 1921.

No Drawing. Application filed December 19, 1918. Serial No. 267,481.

*To all whom it may concern:*

Be it known that I, ARTHUR A. BACKHAUS, of Baltimore, in the State of Maryland, have invented a certain new and useful Improvement in Catalytic Materials and Processes of Making the Same, and do hereby declare that the following is a full, clear, and exact description thereof.

My invention relates particularly to a catalytic material and process of making the same.

The object of my invention is to provide a process by means of which a catalytic agent containing phosphoric acid may be readily obtained and which will be of such a character as to have an active and effective catalytic action.

A further object of my invention is to provide a catalytic agent of this character which is especially adapted for use in the treatment of the vapors of organic substances, as in the production of ethylene from ethyl alcohol.

Further objects of my invention will appear from the detailed description thereof contained hereinafter.

While my invention is capable of embodiment in many different forms, for the purpose of illustration I shall describe only one way of carrying out my invention hereinafter.

For example: I may apply phosphoric acid, that is to say the compound having the formula $H_3PO_4$ and which may be the syrupy phosphoric acid containing 85% of the acid and 15% of water, to a porous material, such for example as coke or pumice stone ground and screened so as to pass through a screen having 3 meshes to the inch but which will be retained by a screen having 4 meshes to the inch, so as to obtain particles substantially ¼ of an inch in diameter. The phosphoric acid is preferably applied to the granular coke or pumice stone by placing the latter in a vacuum, as for example a vacuum of 28 inches of mercury, and then adding thereto a quantity of the syrupy phosphoric acid sufficient to submerge the coke or pumice. The pressure is thereupon released, the excess of liquid is allowed to drain off and as a result a correct quantity of phosphoric acid, which may be about 15% of phosphoric acid to 85% of the coke or pumice, is retained by the absorbent material. This is a quantity of the phosphoric acid which will enable the resultant catalytic material to be effectively used for the production of ethylene by bringing vapors of ethyl alcohol having a strength of substantially 95% into contact therewith at a temperature of 300° C., and which will not ooze out from the absorbent material upon standing.

It will be understood that other absorbent materials may be used instead of the above, and that other catalytic agents may be used also if desired. For example, in the place of the phosphoric acid as applied to pumice stone, I may use concentrated sulfuric acid, although not necessarily with equal advantage.

While I have described my invention above in detail, I wish it to be understood that many changes may be made therein without departing from the spirit of the same.

I claim:

1. The process of producing a catalytic material which comprises applying syrupy phosphoric acid to coke by applying decreased pressure before and during the application of the acid, then releasing said decreased pressure, and then diminishing the acid content sufficiently to obtain a product in which the syrupy phosphoric acid is present in the proportion of about 15% and the coke is present in the proportion of about 85%.

2. The process which comprises associating about 15% of syrupy phosphoric acid with about 85% of an absorbent solid.

3. The process which comprises incorporating about 15% of syrupy phosphoric acid with about 85% of granular coke by varying the atmospheric pressure upon the associated materials and then eliminating an excess of acid.

4. A catalytic material comprising about 85% of a lumpy absorbent material and about 15% of phosphoric acid.

5. A catalytic material for the production of ethylene from alcohol comprising about 85% of coke and about 15% of absorbent phosphoric acid.

6. A catalytic material for the treatment of vapors of organic substances comprising comparatively uniform lumps of an inorganic absorbent material associated with about 15% of a hygroscopic mineral acid.

In testimony that I claim the foregoing I have hereunto set my hand.

ARTHUR A. BACKHAUS.

Witnesses:
E. J. WINTER,
WILLIAM WATSON.